United States Patent [19]
Sturt

[11] 3,876,597
[45] *Apr. 8, 1975

[54] POLYMERISATION PROCESS
[75] Inventor: Alan Charles Sturt, Surrey, England
[73] Assignee: BP Chemicals Limited, London, England
[ * ] Notice: The portion of the term of this patent subsequent to May 16, 1989, has been disclaimed.
[22] Filed: Feb. 5, 1971
[21] Appl. No.: 113,066

[52] U.S. Cl. ............... 260/29.6 CM, 260/29.6 PM; 260/884; 260/885; 260/899
[51] Int. Cl. ........................ C08f 3/30; C08f 15/32
[58] Field of Search .................. 260/92.8 W, 884

[56] References Cited
UNITED STATES PATENTS
3,583,956   6/1971   Pointer et al. ............... 260/86.3
3,725,375   4/1973   Sturt ............................ 260/92.8 W Primary Examiner—Joseph L. Schofer
Assistant Examiner—John Kight
Attorney, Agent, or Firm—Brooks Haidt & Haffner

[57] ABSTRACT

Emulsion polyvinyl chloride made using a fatty acid salt emulsifying agent is recovered by adding more monomer, converting the emulsion to a suspension system by the addition of acid and a suspension stabiliser, and polymerising the added monomer under suspension conditions.

5 Claims, No Drawings

POLYMERISATION PROCESS

The present invention relates to a process for the production of polymeric material by the polymerisation of vinyl chloride in aqueous dispersion.

The polymerisation of vinyl chloride in aqueous dispersion is well known. When the dispersion and the produced polymeric vinyl chloride is in the form of fine droplets or particles which have been stabilised by means of emulsifying agents and the like to such an extent that the aqueous dispersion is stable for some time after any mechanical stirring used to maintain it is stopped, the polymerisation process is known as emulsion polymerisation. When the dispersion and the produced polymeric material is in the form of large droplets or particles which coalesce or settle out from the aqueous phase when the mechanical stirring is stopped, the polymerisation process is known as suspension polymerisation. Suspension stabiliser systems are usually present in a suspension process in order to control the particle size and to ensure that the suspension does not break down during polymerisation. The instability of suspension polymerisation processes is particularly marked in the initial stage of the polymerisation, i.e. before 50 percent polymerisation is achieved.

Emulsion polymerisation has certain advantages over suspension polymerisation in that it can readily be operated with little reactor fouling at a high ratio of monomeric/polymeric material to aqueous phase. However, when applied to the production of a non-film forming polymer such as PVC, the product is difficult to isolate because of the fine particle size.

An object of the present invention is to provide an improved process for polymerisation of vinyl chloride in aqueous dispersion. A further object is to provide a process for the production of vinyl chloride polymers having good processing properties.

Accordingly the present invention is a process which comprises polymerising vinyl chloride under emulsion polymerisation conditions using a saturated fatty acid soap emulsifying agent, allowing the emulsion polymer to absorb vinyl chloride monomer, transforming the emulsion system into a suspension system by the addition of acid and polymerising the absorbed vinyl chloride monomer under suspension polymerisation conditions.

The vinyl chloride in the first stage polymerisation may, if desired, be mixed with other monomers that are copolymerisable therewith provided that the formed copolymer is a non-film forming copolymer, i.e. has a glass transition temperature ($T_g$) above 10°C. Such copolymers are incapable of forming a coherent film when deposited on a suitable substrate from an aqueous emulsion thereof and allowed to dry at temperatures below about 10°C, say 5°–10°C. Examples of suitable comonomers are, methyl methacrylate, vinyl esters such as vinyl acetate and ethyl acrylate, propylene, ethylene, isobutene, and 4-methyl-pentene-1. Generally the copolymerisable monomer will not be present in an amount greater than 25 percent by weight of the total weight of vinyl chloride and copolymerisable monomer employed in the first stage emulsion polymerisation.

The emulsion vinyl chloride polymer is either present as an emulsified latex or as a suspension when it absorbs the second stage vinyl chloride.

The emulsion polymer may be mixed with other emulsion polymers before the suspension polymerisation stage of the process. This technique can lead to the production of useful blended products. The added emulsion polymer need not necessarily be a non-film forming polymer. Useful product blends can be formed by adding to the emulsion vinyl chloride polymer any of the known polyvinyl chloride additives that are available in suitable aqueous dispersion. Examples of such additives are toughening agents such as ethylene/vinyl acetate copolymers and process aids such as styrene/acrylonitrile copolymers and polymethyl methacrylate.

The quantity of second stage vinyl chloride monomer is preferably not greater than the amount of monomer that the vinyl chloride emulsion polymer can absorb under the prevailing conditions, although larger amounts can be employed if desired. The weight of monomer employed in the second stage is suitably not greater than the weight of emulsion polymer present. In practice the polymer to monomer ratio lies in the range 50:50 to 97.5:2.5 and is preferably in the range 70:30 to 92.5:7.5.

The vinyl chloride employed in the second stage of the process may contain up to 25 percent weight of a copolymerisable monomer. Preferably pure vinyl chloride is used. This embodiment can lead to a process in which vinyl chloride homopolymer is produced by an emulsion process and recovered in the form of easily handled bead-like particles.

The emulsion polymerisation stage of the process must be carried out in the presence of a saturated fatty acid soap emulsifying agent using the well known emulsion polymerisation techniques. These are, for example, described in volume IX of the series of monographs on the chemistry, physics and technology of high polymeric substances published by Interscience Publishers, Inc., New York.

Conventional components of vinyl chloride polymerisation systems can be present in the emulsion polymerisation stage of the present invention, e.g. polymerisation initiator systems, preferably water-soluble, molecular weight modifiers and the like. Conventional phase ratios of organic to aqueous phases can be employed.

The second stage vinyl chloride may be added to the emulsion polymer latex, or, preferably, the vinyl chloride emulsion polymer may absorb vinyl chloride as it is formed and thus during the emulsion polymerisation stage a point will arise when the formed vinyl chloride polymer will have adsorbed therein a minor proportion of vinyl chloride. Thereafter and at any time subsequently while the polymerisation system contains vinyl chloride the emulsion polymerisation system can be transformed into a suspension sustem according to the present invention.

In order to transform the emulsion system into a suspension system, it is preferred to destroy the emulsion in the presence of a suspension stabiliser system in order to prevent complete coagulation of the vinyl chloride polymer. However, by careful control of the agitation to which the polymerisation system is subjected it is possible to transform the emulsion system to a suspension system in the absence of a suspension stabiliser.

The emulsion system is transformed by reducing the efficiency of the emulsifying agent employed by adding an acid to the system. The fatty acid soap emulsifying agent used in the first stage of the process is the salt of a saturated carboxylic acid, which acid is not an effective emulsifying agent. Therefore, the emulsion system is destroyed by the addition of a relatively strong acid to the system thus facilitating the formation of the suspension system. Examples of suitable saturated carboxylic acid soap emulsifying agents are the alkali metal or ammonium salts of lauric acid, stearic acid, palmitic acid and myristic acid. The added acid is preferably water-soluble. Examples of preferred acids are acetic, propionic and phosphoric acids. Other examples are acid phosphate salts and sulphuric and hydrochloric acids.

A suspension stabiliser system must be present during the second stage of the process of the present invention in order to ensure that the polymerisation of the second monomer takes place under suspension polymerisation conditions. Suspension stabiliser systems are well known and can contain suspending agents of the organic or inorganic type and can be water soluble or insoluble. Examples of suitable organic suspending agents are polyvinyl alcohol, partially hydrolysed polyvinyl acetates, salts of styrene-maleic anhydride copolymers, gelatin, cellulose ethers such as methyl cellulose, hydroxypropyl methyl cellulose and hydroxyethyl cellulose. Mixtures of organic and inorganic suspending agents and of water soluble and insoluble suspending agents can be used.

Conventional suspension polymerisation conditions can be employed in the final polymerisation stage of the process of the present invention. It is possible to use a higher ratio of organic phase to aqueous phase than can be used in processes in which the vinyl chloride is polymerised entirely under suspension conditions. Thus it is possible to convert a highly concentrated emulsion polymerisation system to a suspension system without necessarily having to add further quantities of water.

In the polymerisation of the absorbed monomeric material, it is preferred to employ a polymerisation initiator. As is conventional in suspension polymerisation systems, the polymerisation initiator is most suitably soluble in the absorbed monomeric material.

The product of the process of the present invention can be isolated by the means conventionally used for suspension polymers. The products behave like conventional suspension polymers in that they can be readily washed and can be recovered by simple filtration or decantation techniques. Moreover the individual polymer particles retain their identity in suitable recovery processes. This is in marked contrast to the polymeric material recovered from conventional emulsion polymerisation processes by coagulation, for example by the addition of an electrolyte, of the emulsion polymer particles in the aqueous latex. The coagulum frequently is in the form of a cream in which it is difficult to wash the polymer and from which it is difficult to isolate dry polymer. Moreover, the isolated product tends to break down again to particles of emulsion polymer size when subjected to shear during conventional heating and drying procedures.

Vinyl chloride polymers produced according to the present invention are particularly valuable in that they have rapid fusion times, i.e. when subjected to work in a heated pressure forming machine they rapidly fuse and readily flow in the machine. The property of improved fusion times is retained in the presence of lubricants which, in conventional vinyl chloride polymers, tend to increase fusion times. The addition of vinyl chloride polymers according to the present invention to conventional vinyl chloride polymers gives blends that have surprisingly low fusion times.

The present invention is illustrated by the following examples in which the parts quoted are by weight.

EXAMPLE 1

Vinyl chloride was polymerised in aqueous emulsion using ammonium stearate as the emulsifying agent to give a latex having a polymer content of 37 percent. A suspension resin was then made from 75 parts of this PVC latex (dry weight) and 25 parts of vinyl chloride with the following recipe.

| Vinyl chloride | 175 g. |
| Distilled water | 1,925 g. |
| PVC latex (37% solid) | 1,400 g. |
| Elvanol 50-42* | 7 g. |
| Acetic acid (10% w/w) | 70 ml. |
| Lauroyl peroxide | 2 g. |

*Polyvinyl alcohol, partly hydrolysed, medium viscosity.

The latex was added with stirring to a solution of the polyvinyl alcohol in a litre of the distilled water. This gave a mixture of pH 9.8. The acetic acid solution was then added slowly with stirring which reduced the pH to 5.

Next the mixture was charged into a stainless steel reactor with the initiator and the remainder of the water. The reactor was purged with nitrogen and evacuated, and then vinyl chloride was sucked into the reactor. To effect polymerisation the reactor was heated at 60°C for 6 hours while stirring at 700 r.p.m. After 6 hours the reactor was cooled and the residual monomer vented off.

The product was readily filtered and washed on the filter. The dry material weighed 610 g. and examination by scanning electron microscope showed that it contained particles ranging from 20 to 100 $\mu$.

EXAMPLE 2

A suspension resin was made from 90 parts (dry weight) of the PVC latex described in Example 1 and 10 parts of vinyl chloride with the following recipe.

| Vinyl chloride | 70 g. |
| Distilled water | 1,630 g. |
| PVC latex (37% solid) | 1,800 g. |
| Polyvinyl alcohol as Example 1 | 7 g. |
| Acetic acid (10% w/w) | 90 ml. |
| Lauroyl peroxide | 2.0 g. |

The procedure was as described in Example 1. After 6 hours at 60°C the reactor was cooled and vented.

The product was again readily filtered and washed on the filter. After drying in a vacuum oven at 45°C for 48 hours the product weighed 700 g. Examination by scanning electron microscope showed that it consisted of particles ranging from 20 to 100 $\mu$.

EXAMPLE 3

A resin was made from 75 parts (dry weight) of PVC latex described in Example 1 and 25 parts of vinyl chloride with the following recipe.

| | |
|---|---|
| Vinyl chloride | 175 g. |
| Distilled water | 1,925 g. |
| PVC latex (37% solid) | 1,400 g. |
| Polyvinyl alcohol as Example 1 | 7 g. |
| Sodium hydroxide (10% w/w) | 0.2 ml |
| Acetic acid (10% w/w) | 80 ml |
| Lauroyl peroxide | 2.0 g. |

The polyvinyl alcohol was dissolved in the distilled water and the sodium hydroxide added to raise the pH from 5.3 to 10. The latex was added to that solution and stirred thoroughly. This mixture was charged into a stainless steel reactor together with the initiators. The reactor was purged with nitrogen and evacuated, and the vinyl chloride was sucked in. The charge was stirred at 120 r.p.m. for 30 minutes, during the last 10 minutes of which the acetic acid solution was pumped in.

The stirrer speed was then increased to 700 r.p.m. and the charge heated at 60°C for 6 hours during which the polymerisation took place. After this period the charge was cooled and vented to atmospheric pressure.

The product was easily filtered and washed on the filter. After drying in a vacuum oven at 45°C for 48 hours 656 g. of product were obtained. Microscope examination showed that the particles ranged from 40 to 200 $\mu$.

EXAMPLE 4

A resin was made from 90 parts (dry weight) of the PVC latex described in Example 1 and 10 parts of monomer with the following recipe.

| | |
|---|---|
| Vinyl chloride | 350 g. |
| Distilled water | 8,500 g. |
| PVC latex (36.5% solid) | 8,640 g. |
| Alcotex 88-10* | 35 g. |
| Lauroyl peroxide | 10 g. |

*Polyvinyl alcohol, 88% hydrolysed, medium viscosity.

The polyvinyl alcohol was dissolved in 4 litres of water and the solution was poured into a stainless steel reactor. The remainder of the water, the initiator and the latex were then added and the reactor purged with nitrogen. The vinyl chloride was sucked into the reactor and the mixture was stirred at 700 r.p.m. The charge was heated at 60°C for 6 hours, and then cooled and vented to atmosphere.

The product was easily separated from the aqueous phase by basket centrifuge, and it was washed with water in the centrifuge. A yield of 3,370 grams of dry product was obtained. Microscopic examination showed that the particle sizes ranged from 20 to 60 $\mu$.

EXAMPLES 5 to 14

In the examples two general methods were employed as set out below as methods A and B to treat various polyvinyl chloride emulsion polymers (latices) with vinyl chloride and then recover polymer in suspension form after completing the process according to the present invention. The latices were prepared by normal emulsion polymerisation techniques using the emulsifying agents indicated. Various commercial chemicals were used. Their chemical names are as follows:

| Commercial Name | Chemical Name |
|---|---|
| Goshenol | Poly(vinyl alcohol) |
| Perkadox Y16 | Ditertiarybutylcyclohexyl peroxydicarbonate |
| Alcotex 88-10 | Poly(vinyl alcohol) 88% hydrolysed, medium viscosity |
| Cellosize QP4400 | Hydroxyethyl cellulose, medium viscosity |
| Methocell 65HG | Hydroxypropylmethyl cellulose, medium viscosity. |

METHOD A

The suspending agent(s) was dissolved in the distilled water. The latex was added to the stirred solution. The acetic acid solution was added slowly with stirring so as to reduce the pH of the solution to 5.

The mixture was charged into a stainless steel reactor, together with the initiator. After purging and evacuating the reactor, the vinyl chloride was sucked in. The polymerisation was performed by heating the reactor at 60°C for 6 hours while stirring at the stated stirrer speed.

After 6 hours the reactor was cooled and the residual monomer was vented off.

The product was easily separated from the aqueous phase by basket centrifuge and was washed with water in the centrifuge. It was then dried in a vacuum oven at 45°C.

METHOD B

The suspending agent(s) was dissolved in the distilled water and the latex added to the stirred solution. The mixture was charged into a stainless steel reactor with the initiator.

The mixture was stirred at 300 r.p.m. (unless otherwise stated) for 15 minutes during the last 10 minutes of which the acetic acid solution was added. The reactor was purged with nitrogen and evacuated. The vinyl chloride was then sucked into the reactor.

The polymerisation was then performed by heating the reactor at the stated temperature for the stated time while stirring at the stated stirrer speed. After this period, the reactor was cooled and the residual monomer vented off.

The product was easily separated from the aqueous phase by basket centrifuge and was washed with water in the centrifuge. It was then dried in a vacuum oven at 45°C.

EXAMPLE 5

Method A was applied to the following materials using a stirrer speed of 600 r.p.m. for the suspension polymerisation.

| | |
|---|---|
| Vinyl chloride | 225 g. |
| Distilled water | 1,500 g. |
| Goshenol | 3.5 g. |
| Gelatin | 3.5 g. |
| PVC latex (18.5% solid) | 1,530 g. |
| Acetic acid (10% w/w) | 270 ml. |
| Perkadox Y16 | 1 g. |
| Vinyl chloride/PVC ratio | 45/55 |

The emulsifier was ammonium laurate. The yield of polymer was 329 grams.

EXAMPLE 6

Method A was applied to the following materials using a stirrer speed of 600 r.p.m. for the suspension polymerisation.

| | |
|---|---|
| Vinyl chloride | 175 g. |
| Distilled water | 2,000 g. |
| PVC latex (33% solid) | 1,200 g. |
| Cellosize QP4400 | 1.2 g. |
| Methocell 65HG50 | 0.8 g. |
| Acetic acid (10% w/w) | 80 ml. |
| Lauroyl peroxide | 1 g. |
| Vinyl chloride/PVC ratio | 30/70 |

The emulsifier in the latex was ammonium stearate. The yield of polymer was 466 grams.

EXAMPLE 7

Method A was applied to the following materials using a stirrer speed of 700 r.p.m. for the suspension polymerisation.

| | |
|---|---|
| Vinyl chloride | 40 g. |
| Distilled water | 270 g. |
| PVC latex (29% solid) | 2,660 g. |
| Alcotex 88-10 | 1.75 g. |
| Acetic acid (10% w/w) | 150 ml. |
| Lauroyl peroxide | 1 g. |
| Vinyl chloride/PVC ratio | 5/95 |

The emulsifier was ammonium stearate. The yield of polymer was 562 grams.

EXAMPLE 8

Method B was applied to the following materials.

| | |
|---|---|
| Vinyl chloride | 600 g. |
| Distilled water | 2,000 g. |
| PVC latex (29.1% solids) | 950 g. |
| Goshenol | 3.5 g. |
| Gelatin | 3.5 g. |
| Acetic acid (10% w/w) | 230 ml. |
| Perkadox Y16 | 2 g. |
| Vinyl chloride/PVC ratio | 30/70 |
| Stirrer speed | 700 r.p.m. |

The emulsifiers in the latex were ammonium myristate and palmitate. The yield of polymer was 569 grams after 6 hours at 50°C.

EXAMPLE 9

Method B was applied to the following materials.

| | |
|---|---|
| Vinyl chloride | 225 g. |
| PVC latex (30.5% solids) | 900 g. |
| Methocell 65HG50 | 0.8 g. |
| Cellosize QP4400 | 1.2 g. |
| Distilled water | 1,900 g. |
| Lauroyl peroxide | 1 g. |
| Acetic acid (10% w/w) | 250 ml. |
| Vinyl chloride/PVC ratio | 45/55 |

The emulsifiers in the latex were ammonium stearate and ammonium laurate.
Stirrer speed 600 r.p.m.
Yield 400 g. after 6 hours at 60°C.

EXAMPLE 10

Method was applied to the following materials.

| | |
|---|---|
| Vinyl chloride | 225 g. |
| PVC latex (31.6% solids) | 870 g. |
| Distilled water | 2,000 g. |
| Alcotex 88-10 | 3 g. |
| Lauroyl peroxide | 0.5 g. |
| Perkadox Y16 | 1 g. |
| Acetic acid (10% w/w) | 200 ml. |
| Stirrer speed | 700 r.p.m. |
| Yield after 4½ hours at 50°C | 379 g. |

EXAMPLE 11

Mmethod B was applied to the following materials.

| | |
|---|---|
| Vinyl chloride | 125 g. |
| PVC latex (29.7% solids) | 1,500 g. |
| Alcotex 88-10 | 7 g. |
| Distilled water | 1,800 g. |
| Perkadox Y16 | 1 g. |
| Lauroyl peroxide | 0.2 g. |
| Acetic acid (10% w/w) | 250 ml. |
| Stirrer speed | 700 r.p.m. |
| Yield after 6 hours at 50°C | 502 g. |

EXAMPLE 12

Method B was applied to the following materials.

| | |
|---|---|
| Vinyl chloride | 125 g. |
| Distilled water | 2,000 g. |
| Methocell 65HG | 0.8 g. |
| Cellosize QP4400 | 1.2 g. |
| PVC latex (28.6% solids) | 1,000 g. |
| Perkadox Y16 | 1 g. |
| Acetic acid (10% w/w) | 220 ml. |
| Stirrer speed | 700 r.p.m. |
| Yield after 6 hours at 50°C | 302 g. |

EXAMPLE 13

Method B was applied to the following materials.

| | |
|---|---|
| Vinyl chloride | 36 g. |
| PVC latex (34.7% solids) | 2,000 g. |
| Goshenol | 3.5 g. |
| Distilled water | 1,300 g. |
| Acetic acid (10% w/w) | 200 ml. |
| Perkadox Y16 | 0.3 g. |
| Stirrer speed | 700 r.p.m. |
| Yield after 6 hours at 50°C | 728 g. |

EXAMPLE 14

Method B was applied to the following materials.

| | |
|---|---|
| Vinyl chloride | 225 g. |
| PVC latex (32.5% solids) | 850 g. |
| Methocell 65HG | 0.8 g. |
| Cellosize QP4400 | 1.2 g. |
| Distilled water | 1,950 g. |
| Lauroyl peroxide | 1 g. |
| Acetic acid (10% w/w) | 200 ml. |
| Stirrer speed | 700 r.p.m. |
| Yield after 8 hours at 60°C | 435 g. |

In all examples 5 to 14 inclusive the product was obtained in a suspension form and could be easily collected and washed in the basket centrifuge. In contrast to this attempts to isolate polyvinyl chloride from the latices used in these examples after coagulation of the emulsion particles gave rise to creams that were difficult to wash and agglomerated products which broke down to very fine particles when subjected to shear.

EXAMPLE 15

A suspension resin was made by first making a PVC latex containing free vinyl chloride and then incorporating it in situ into a suspension polymerisation with more vinyl chloride.

The overall charge was

| | |
|---|---|
| Vinyl chloride | 1,100 g. |
| Distilled water | 2,500 g. |
| Stearic acid | 60 g. |
| Ammonia (0.88) | 140 ml. |
| Ammonium persulphate | 0.2 g. |
| Sodium metabisulphite | 0.05 g. |
| Alcotex 88-10 | 5.5 g. |
| Glacial acetic acid | 60 ml. |
| Lauroyl peroxide | 1 g. |

The ammonia, stearic acid (forming ammonium stearate as the emulsifying agent) and ammonium persulphate, sodium metabisulphite and 2,000 ml. of distilled water were charged to a stainless steel reactor. The reactor was sealed, purged with nitrogen and evacuated. 1,000 g. of the vinyl chloride was sucked into the reactor and the charge stirred at 300 r.p.m. The charge was heated at 50°C for 8 hours after which time it was evident that the maximum conversion (about 92 percent) had been reached (this was indicated by the solids content remaining constant at about 30.8 percent.)

The poly(vinyl alcohol) was dissolved in 250 ml. of distilled water and the solution mixed with the glacial acetic acid. The mixture was pumped into the reactor over a period of 30 min. and the remaining 250 ml. of distilled water was pumped in afterwards over a period of 25 min.

The lauroyl peroxide was dissolved in 100 g. of vinyl chloride monomer and this solution was pumped into the reactor.

The stirrer speed was increased to 600 r.p.m. and the temperature of the reactor increased to 60°C. The charge was held at 60°C for 9½ hours. After this period the charge was cooled and the residual monomer vented off.

The product was easily separated from the aqueous phase by basket centrifuge and was washed with water in the centrifuge. It was then dried in a vacuum oven at 45°C. The yield was 988 g.

EXAMPLE 16

A suspension resin was made from 55 parts of a PVC latex (dry weight) and 45 parts of vinyl chloride with the following recipe

| | |
|---|---|
| Vinyl chloride | 225 g. |
| PVC latex (31.5% solids) | 870 g. |
| ALcotex 88-10 | 3.5 g. |
| Distilled water | 2,000 g. |
| Orthophosphoric acid (10%) | 85 ml. |
| Caprylyl peroxide | 1 g. |

The emulsifier in the latex was potassium laurate.

The poly(vinyl alcohol) was dissolved in the distilled water and the latex added to the solution. The mixture together with the caprylyl peroxide was charged into a stainless steel reactor. The charge was stirred at 300 r.p.m. for 20 min. during the last 10 min. of which the orthophosphoric acid was added. The reactor was purged with nitrogen and evacuated. The vinyl chloride was then sucked into the reactor.

The polymerisation was then performed by heating the reactor at 60°C for 8 hours while stirring the charge at 700 r.p.m. After 8 hours, the charge was cooled and the residual monomer vented off.

The product was easily separated from the aqueous phase by basket centrifuge and was washed with water in the centrifuge. It was then dried in a vacuum oven at 45°C. The yield was 418 g.

EXAMPLE 17

A suspension resin was made from 55 parts of PVC latex (dry weight) and 45 parts of vinyl chloride with the following recipe:

| | |
|---|---|
| Vinyl chloride | 225 g. |
| PVC latex (28.8% solids) | 955 g. |
| Cellosize QP4400 | 1.2 g. |
| Methocell 65HG | 0.8 g. |
| Distilled water | 1,900 g. |
| Orthophosphoric acid (10%) | 390 ml. |
| Perkadox Y16 | 1 g. |

The emulsifier in the latex was ammonium laurate.

The hydroxyethyl cellulose and hydroxypropylmethyl cellulose were dissolved in the distilled water and the latex added to the solution. This mixture together with the Perkadox Y16 was charged into a stainless steel reactor. The charge was stirred at 300 r.p.m. for 20 min. during the last 10 min. of which the orthophosphoric acid was added. The reactor was purged with nitrogen and evacuated. The vinyl chloride was then sucked into the reactor.

The polymerisation was then performed by heating the reactor at 50°C for 10 hours while stirring the charge at 700 r.p.m. After 10 hours, the charge was cooled and the residual monomer vented off.

The product was easily separated from the aqueous phase by basket centrifuge and was washed with water in the centrifuge. It was then dried in a vacuum oven at 45°C. The yield was 447 g.

EXAMPLE 18

A suspension resin was made from 90 parts of a polyvinyl chloride latex (dry weight) and 10 parts of vinyl chloride with the following recipe.

| | |
|---|---|
| Vinyl chloride | 70 g. |
| PVC latex (34.5% solids) | 1,800 g. |
| Distilled water | 1,630 g. |
| Elvanol 50-42* | 1 g. |
| Acetic Acid (10% w/w) | 90 ml. |
| Lauroyl Peroxide | 2 g. |

*Poly(vinyl alcohol), partly hydrolysed, medium viscosity.

The emulsifier in the latex was ammonium stearate.

The polyvinyl alcohol was dissolved in the distilled water and the latex added to the solution and stirred thoroughly. This mixture was charged into a stainless steel reactor together with the initiator. The reactor was purged with nitrogen and evacuated and the vinyl chloride was sucked in.

The charge was stirred at 120 r.p.m. for 30 minutes during the last 10 minutes of which the acetic acid solution was pumped in. The stirrer speed was then increased to 700 r.p.m. and the charge heated at 60°C for 6 hours during which polymerisation occurred. After that period the charge was cooled and vented to atmospheric pressure.

The product was readily filtered and washed on the filter. After drying in a vacuum oven at 45°C, the product weighed 685 g.

EXAMPLE 19

A suspension resin was made from 90 parts of a polyvinyl chloride latex (dry weight) and 10 parts of vinyl chloride with the following recipe.

| | |
|---|---|
| Vinyl chloride | 600 g. |
| PVC latex (36% solid) | 15,000 g. |
| Distilled water | 3,600 g. |
| Alcotex 88-10 | 35 g. |
| Acetic Acid (10% w/w) | 1,000 ml. |
| Lauroyl Peroxide | 10 g. |

The emulsifier in the latex was ammonium stearate.

The procedure was the same as in Example 18 but product was dried in air-circulating oven at 50°C.

The yield was 5,616 g.

The product of examples 6, 18 and 19 were tested as described below in a Brabender for fusion times and compared with conventional polyvinyl chloride polymers. The Brabender was operated under the following conditions:

| | | |
|---|---|---|
| Oil Bath | — | 140°C |
| Mixing Chamber | — | 135°C |
| Mixer Speed | — | 30 r.p.m. |
| Charge | — | 32 grams |

The polyvinyl chloride polymers were compounded before testing as follows:

| | |
|---|---|
| Polymer | — 100 parts by weight |
| Tin stabiliser (Melite 31) | — 1.5 parts by weight |
| Stearic acid (lubricant) | — as indicated. |

Table 1 gives the fusion times in minutes of three commercial polyvinyl chloride polymers Breon 115, Breon 113 (sold by BP Chemicals International Limited) and D 65/6 (sold by Imperial Chemical Industries Limited), the spray-dried polymer obtained from the latex used in Examples 6 and 18 with the fusion time of the products of examples 6 and 18 at varying levels of added lubricant.

Table 2 gives the fusion times in minutes for various mixtures of Breon 115 with a commercially available emulsion polyvinyl chloride polymer (Vestolit G), the spray dried polymer from the latex used in examples 6 and 19 and the products of examples 6 and 19. The formulation used was

| | | | |
|---|---|---|---|
| Breon 115 | — | (100 - X) | parts by weight |
| Added polymer | — | X | parts by weight |
| Stearic acid | — | 1.25 | parts by weight |
| Tin stabiliser (Mellite 31) | — | 1.5 | parts by weight |

Table 2

| Value x | Added Polymer | | | |
|---|---|---|---|---|
| | Vestolit G | Spray-dried latex | Example 19 | Example 6 |
| 0 | 54 | 54 | 54 | 54 |
| 10 | — | 120 | 24.5 | — |
| 20 | >120 | >120 | 11 | 12 |
| 40 | >120 | >120 | 3 | — |
| 50 | 6.25 | 13 | 1.5 | 2 |

Table 3 gives the fusion time in minutes for various mixtures compounded as in table 2 of Breon 115 with the spray dried polymer from the latex used in example 19 and the product of example 19 at a lubricant level of 0.5 parts by weight of stearic acid and a tin stabilizer content of 1.5 parts by weight.

Table 3

| Value of x | Spray-dried latex | Example 19 |
|---|---|---|
| 0 | 3 | 3 |
| 10 | 5 | 3 |
| 20 | 6 | 2.25 |
| 40 | 5 | 1.5 |
| 100 | 4 | Immediate |

I claim:

1. A process which comprises polymerising vinyl chloride under emulsion polymerisation conditions using a saturated fatty acid soap emulsifying agent, allowing the emulsion polymer to absorb vinyl chloride monomer in an amount so that the polymer to monomer ratio lies in the range of from about 70:30 to 92.5:7.5, transforming the emulsion system into a suspension system by the addition of acid and polymerising the absorbed vinyl chloride monomer under suspension polymerisation conditions.

2. A process as claimed in claim 1 wherein the second monomeric material is pure vinyl chloride.

3. A process as claimed in claim 1 wherein the second stage monomeric material comprises unpolymerised vinyl chloride from the first stage polymerisation.

4. A process as claimed in claim 1 wherein the saturated fatty acid soap emulsifying agent is an alkali metal or ammonium salt of lauric acid, stearic acid, palmitic acid or myristic acid.

5. A process as claimed in claim 1 wherein the acid used to transform the emulsion system into a suspension system is acetic acid, propionic acid or phosphoric acid.

* * * * *

Table 1

| Lubricant, parts per hundred polymer | Breon 115 | Breon 113 | D 65/6 | Spray-dried latex | Examples 6 | 18 |
|---|---|---|---|---|---|---|
| 0.5 | 6 | 9.5 | not tested | 6 | I | not tested |
| 1.0 | — | >60 | >60 | 10.5 | I | I |
| 2.0 | — | — | — | — | I | I |
| 4.0 | — | — | — | — | I | 2 |

I = Immediate.

UNITED STATES PATENT OFFICE
CERTIFICATE OF CORRECTION

PATENT NO. : 3,876,597
DATED : April 8, 1975
INVENTOR(S) : ALAN CHARLES STURT

It is certified that error appears in the above–identified patent and that said Letters Patent are hereby corrected as shown below:

Col. 8, Example 10, line 2, after "Method" insert --B--

Col. 8, Example 11, line 16, correct the spelling of "Method".

Signed and Sealed this thirtieth Day of September 1975

[SEAL]

Attest:

RUTH C. MASON
Attesting Officer

C. MARSHALL DANN
Commissioner of Patents and Trademarks